Oct. 3, 1961  V. HECHLER IV  3,003,088
DETECTION CIRCUIT
Filed July 19, 1957  2 Sheets-Sheet 1

INVENTOR.
Valentine Hechler, IV
BY
Atty

Oct. 3, 1961 V. HECHLER IV 3,003,088
DETECTION CIRCUIT
Filed July 19, 1957 2 Sheets-Sheet 2

INVENTOR.
Valentine Hechler, IV
BY
Atty.

United States Patent Office 3,003,088
Patented Oct. 3, 1961

---

3,003,088
DETECTION CIRCUIT
Valentine Hechler IV, Evanston, Ill., assignor to Webcor, Inc., Chicago, Ill., a corporation of Illinois
Filed July 19, 1957, Ser. No. 672,997
1 Claim. (Cl. 317—151)

This invention relates to a detection circuit, and more particularly to a circuit characterized by its production of a pulse upon the occurrence of an interruption in the normal condition thereof through interrupter means responsive to a change in an external situation to be detected by the circuit. The circuit may be employed, for example, for energizing a counter to indicate the number of articles passing from a conveyor, and to control movement of the articles.

The specific embodiment of the invention is to be described in detail herein is shown in the exemplary environment of an article dispenser, and its function is that of providing an accurate control of the articles discharged by the dispensing apparatus and in some environments where it is necessary to have an absolutely accurate indication of the number of articles being dispensed it provides for this also, such as where the dispensing apparatus might be shut off prematurely permitted to run for an excessive time, or perhaps not started into operation following a period of interruption in a sequential operating cycle.

A need then exists for an improved detection circuit, and it is accordingly an object of this invention to provide such an improved circuit. Another object of the invention is that of providing a detection circuit that will not produce false counts, and which is functional then to provide accurate indications of the number of changes that occur in an external situation to be detected by the circuit. Still another object is in the provision of a circuit equipped with an interrupter means which are responsive to changes that occur in an environment external of the circuit and which function to interrupt the normal condition of the circuit, whereupon it produces a pulse or current surge that may be used to provide an indication or count of such changes.

Yet another object is to provide a circuit having a voltage doubler and feed-back network which functions to supply a current surge through portions of the circuit following an interruption in the normal condition thereof, such current surge being representative therefore of the change in the normal condition thereof. A further object is to provide a circuit of the character described, wherein the feed-back is counter-balanced at predetermined times when the normal condition of the circuit is disturbed or interrupted, whereby there is no current surge or pulse to indicate such disturbance, and this feature is of importance for preventing false counts.

Yet a further object of this invention is in the provision of a pulse circuit having a normally closed switch in a feed-back branch thereof which is adapted to be positioned adjacent an end of a dispenser (a conveyor, for example) and to be opened each time an article passes thereover—such switch performing the function of an interrupter for the circuit which functions, following each normal interruption, to produce a current surge utilizable in energizing a counter and a visual indicator whereby the passage of each article from the dispenser is made known. Additional objects and advantages of the invention will become apparent as the specification develops.

An embodiment of the invention is illustrated in the accompanying drawing, in which.

Figure 1:
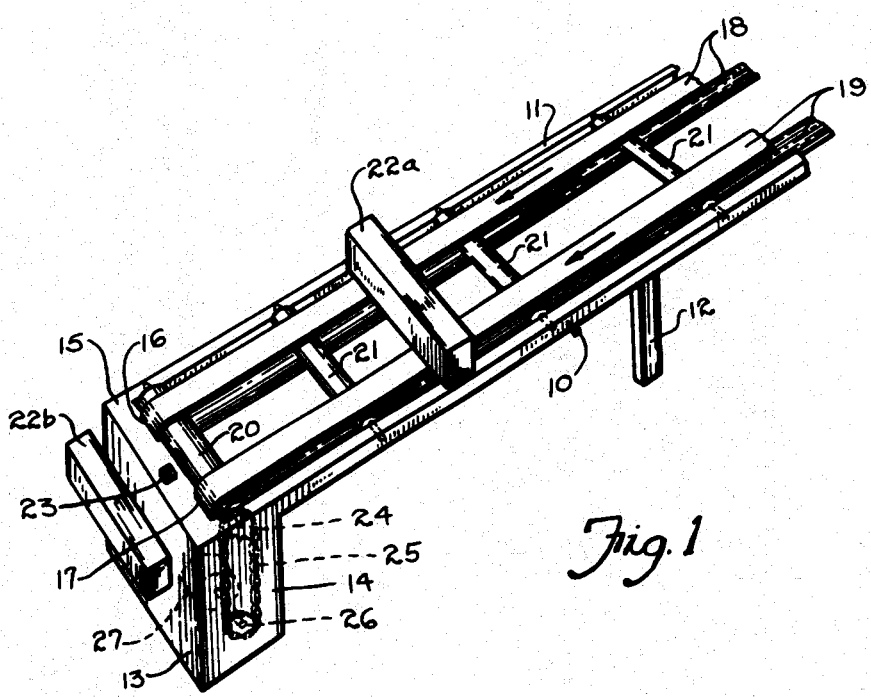
FIG. 1 is a broken perspective view showing a conveyor as an environmental setting with which the invention may be used.

To facilitate a description of the circuit that comprises an embodiment of the invention, it is shown in conjunction with a conveyor which will first be described. The conveyor may take varied forms, and the conveyor mechanism per se is not herein considered an inventive feature.

The specific illustration comprises a frame having substantially parallel rails or supports 10 and 11 which may be equipped with a plurality of depending support legs 12, and at their forward ends are rigidly secured to a depending front panel 13 and side panels 14 joined thereto. Preferably, a top panel 15 is rigid with the front and the side panels and with the rails 10 and 11, and is provided with spaced apart, parallel slots or recesses 16 and 17 therethrough. These slots pass the respective endless conveyor belts 18 and 19 therethrough which are entrained adjacent the slots 16 and 17 about a drive roller 20, and are preferably supported intermediate the ends of the rails 10 and 11 by spaced apart rollers 21 which are rotatably journalled at the respective ends thereof in the rails 10 and 11.

The endless belts 18 and 19 travel in the direction of the arrows, or toward the left in FIG. 1, and are adapted to carry articles such as the packages or cartons 22 to the forward discharge end of the conveyor. Such cartons in passing from the ends of the conveyor belts, travel over a switch 23 to actuate the same. As will be brought out more fully hereinafter, the switch 23 is normally closed and may be carried by the top plate 15 of the conveyor structure. It will be noted that FIG. 1 shows a carton 22 adjacent the front panel 13 of the conveyor structure and below the cover plate 15 thereof, and such carton has actuated the switch 23 in moving to the illustrated position from the ends of the conveyor belts.

The drive roller 20 may be equipped at one end thereof with a sprocket 24 having a drive chain 25 entrained thereabout, which at its opposite end is entrained about a drive sprocket 26 rotatably driven by a motor 27. It will be appreciated from what has been said, that the conveyor described is to be considered exemplary only and may, of course, be substantially altered in form.

Figure 2:
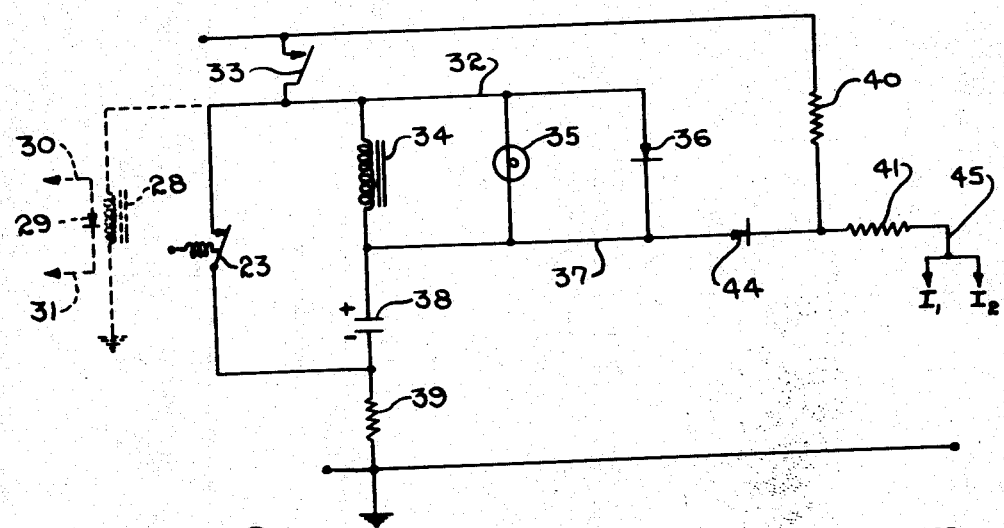
FIG. 2 is a schematic diagram of a circuit embodying the invention.

Referring now to the circuit illustration of FIG. 2, it will be seen that the switch 23 is schematically illustrated and is shown in its normally closed position. To the left of this switch is a relay or solenoid 28 having switch contacts 29 which are adapted to be connected to the motor 27 for energizing the same. That is to say, one side of the contacts 29 may be connected to a power source, as through the line 30; and the other side thereof connected to the motor 27 through the line 31. Therefore, when the solenoid 28 is energized, power is supplied to the motor 27 through the contacts 29, and the conveyor will then be actuated.

The solenoid 28 is shown in dotted lines for it is only incidentally related to the detection circuit and may in certain instances, as shown in the drawing, be energized when power is supplied to the circuit. Both the relay 28 and switch 23 are seen to have one side thereof connected to a common line 32 which may be thought of as the power source, although in the illustration the line 32 is connected to a source of D.C. voltage through a switch 33. It should be noted that while the switch is shown as a conventional on-off switch, such showing is intended to be exemplary of any type of connector means which could be employed to establish connection of the circuit to a power source, and will ordinarily be a pair of contacts of a control relay. The specific embodiment of the circuit illustrated is adapted for use with a 28-volt D.C. power source.

Shown connected in parallel with each other are control and indicating devices 34 and 35, hereinafter generally referred to as indicia devices, and a unidirectional current flow device 36. Each of these devices has one side thereof connected to the common line 32. The indicia device 34 could be an electronic or magnetic counter. In the representation shown, it is illustrated in the form of a relay device providing a resistance work load and adapted to be energized when a current of predetermined magnitude or pulse characteristic flows therethrough. The switch contacts (not shown) of this solenoid may be connected in circuit with a counter in a manner such that the counter circuit is actuated when the solenoid is energized, whereupon the counter registers such condition of energization. The indicia device 35 is shown as a light and, therefore, provides a visual indication of a flow of current therethrough having sufficient magnitude to energize the same.

The uni-directional current flow device 36 is a rectifier and may be of the semi-conductor, junction type which is suitable for handling the relatively large current surges that flow in the circuit. It is apparent that the input side of the rectifier 36 is connected to the positive or common line 32, and its resistance is extremely low when compared to that of the devices 34 and 35 so that current will flow therethrough to the almost complete exclusion of current flow through the parallel devices 34 and 35 when the direction of current flow is such as to be passed by the rectifier.

The line of common connection between the relay 34, light 35 and rectifier 36 is designated with the numeral 37, and connected thereto is a capacitance 38 having a relatively large value, which in this particular circuit embodiment is in the order of about 100 microfarads. The capacitance 38 is grounded through a charging resistance 39, and it is apparent that one side of the switch 23 is connected to the common point between the serially connected capacitor and charging resistance.

The components thus far described constitute the essential elements of the detection circuit exemplifying the present invention. However, such circuit embodiment may be used in conjunction with a pulse transmitting network, that maintains operative readiness free of any excursions occurring in the circuit other than desired pulses, which comprises a resistance 40, one side of which is connected directly to a 28-volt power source and the other side of which is connected to a resistance 41 and commonly therewith to the output side of a rectifier 44 which has minimum resistance to current flow in the direction indicated in the drawing. The rectifier may be a semi-conductor, junction type rectifier, and its cathode or input side is connected to the line 37. The rectifier 44 prevents the source voltage through resistance 40 from appearing on the line 37, and it receives and transmits pulses that have a value above the source voltage when such pulses are present in the line 37. The pulse output from this circuit appears at lead 45 and, as indicated in FIG. 2, the lead 45 may be divided into two points of connection $I_1$ and $I_2$ which are connected to a counter circuit, as hereinafter described.

In describing the operation of the circuit, assume for convenience a condition in which switch 33 is closed and an article 22 is resting on the switch 23. At this time, the switch 23 will be open and the capacitor 38 is charged through rectifier 36 to a plus voltage potential of 28 volts with the other side thereof effectively grounded at zero voltage by resistor 39. Neither the relay 34 nor the light 35 will have been energized since any flow of charging current to the capacitor will have been through rectifier 36.

Now then, when the article 22 is passed from engagement with the switch 23 and may be, for example, in the position 22b illustrated in FIG. 1, the switch will return to its normally closed condition and therefore forms a short circuit across the serially connected relay 34 and capacitor 38, and places a potential of 28 volts on the ground side of the capacitor. Under this condition, the resistor 39 prevents a full short to ground, and is selected to have the lowest value possible compatible with non-excessive current drain. It is apparent that since the capacitor already has a charge of 28 volts thereacross, an effective potential of 56 volts is now present at the positive side of the capacitor—that is, on the line 37. The result of this is that the capacitor attempts by reverse current flow to discharge, and being blocked by the rectifier 36 causes a current flow through the energizing coil of the relay 34 and through the light 35. This blocking by the rectifier occurs because of its uni-directional current flow characteristic. The magnitude of the current surge is sufficient to energize the relay 34, whereupon control can be effected and the counting device actuated; and, to energize also the light 35, whereby a visual indication of such current flow is provided. The size of the capacitor 38 is related to the load carried by its discharge, but in the embodiment shown is 100 mf. In other electronic circuits, the value could be as low as .1 mf., for example or much higher than 100 mf. if desired. The bigger the capacitor, the longer the current flow is sustained.

The relay 34 and light 35 will remain energized an appreciable time before the capacitor is discharged to the fallout current value of the relay. The circuit will then be returned to its original condition when the switch 23 is again opened by a package. Thereafter the cycle is repeated beginning with a charging of the capacitor 38 to a voltage differential as already described through the rectifier 36. When the switch 23 is closed, the capacitor discharges as described, to energize the indicia devices 34 and 35 and register another count and visual indication thereof. Such cyclic operation is continued so long as the conveyor mechanism is actuated and cartons or articles 22 pass over the switch 23.

It will be appreciated that the circuit functions as a voltage doubler and pulse-generating network in that it periodically develops an effective 56 volts on the line 37 to generate a current utilized in the embodiment shown as a pulse of predetermined duration.

It will be noted from the foregoing description that the circuit is operative to sense or detect a change in a condition external thereof, and in the specific environmental setting functions to provide a determination of the passage of articles 22 from the end of the conveyor apparatus. Attention should be directed to the fact that an indication of the discharge of an article from the conveyor is provided only after an article has passed completely over the switch 23. This consideration is of importance in the feature of the circuit which prevents false counts. In this respect, consider first a condition wherein the conveyor is deactuated with an article 22 resting on the switch 23 whereupon it is open. The circuit will, of course, provide no indication of the presence of the article on the switch before the conveyor action is terminated. Now, if the conveyor is reactuated, the capacitor 38 immediately charges, and the charging rate is rapid because of the low resistance of the resistor 39. Consequently, when the operation of the conveyor now moves the article from the switch causing it to return to its normally closed condition, the capacitor discharges and therefore causes a register of the passing of the article from the conveyor.

Consider on the other hand, a condition that is prone to cause false counts in prior art devices, and that is when the apparatus is deactuated with the detector switch 23 thereof normally closed. If the operation of the conveyor is characterized by cyclic starting and stopping, especially of an irregular manner and where the stops are for short (sometimes almost instantaneous) periods, then the set effect is substantially the same as if the detector switch had been opened and closed, and it will be apparent that this would of course result in false counts. The present circuit obviates this disadvantage in that it ignores any position that the switch 23 may happen to be in when the conveyor is first actuated; and even though the switch 23 is closed and the remaining circuit therethrough is in operative condition, one package must pass over the switch before any pulse of any nature is actually generated to energize the counter relay 34 and light 35. This does not mean, however, that there may not be some voltages appear at the capacitor, but rather that any voltages that do appear are initially counter-balanced upon closure of switch 33, and such counter-balance is effective until after one package advances completely over the switch 23 which, as has been stated, results in an effective pulse that energizes the indicia devices 34 and 35.

The remaining circuitry, as has been brought out before, transmits and shapes useful pulses in accordance with the current surges that energize the indicia devices 34 and 35, and such useful pulses may be employed in a variety of applications as, for example, in triggering dividing circuits, as additionally described hereinafter.

The circuit of FIG. 2 is essentially a current utilization circuit, and depends for its success on the maintenance of a current flow through the relay 34 even though the voltage across the relay, or across the relay and the capacitance 38 and resistance 39 connected in series therewith, changes. For example, the voltage at the end points of the relay 34 shifts in that the voltage at the upper end thereof is either zero or +28 volts depending upon the position of the switch 33; and the voltage at the lower end thereof is zero when the switch 33 is open, is 28 volts when the switches 23 and 33 are closed, and is thereafter momentarily 56 volts when the switch 23 has been opened. After this latter condition, when switch 33 is opened the voltage at line 37 immediately drops to zero. Current nevertheless continues to flow through the relay 34 and through the indicia device 35, thereby giving the requisite signals until the capacitor 38 is discharged or switch 23 is opened.

In some instances, it may be desirable to eliminate the relay 34 and transistorize the circuit. In such event, it is advisable to utilize changes in voltage appearing on the line 37 or, more specifically, at the point of connection between the resistance 40 and rectifier 44. However, as explained above, the voltage at this point immediately decays to zero when the switch 33 is opened. Consequently, a modified type of circuit would then be necessary which would function to hold and store for a relatively long time the pulses that appear at this point. Such a circuit is illustrated in FIG. 3, and it will now be described.

Figure 3:
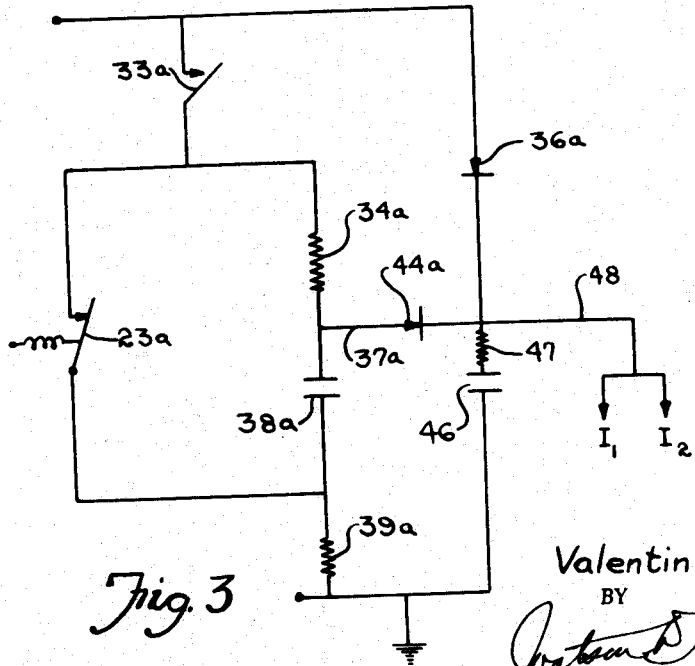
FIG. 3 is a schematic diagram of a modified circuit.

The circuit of FIG. 3 includes a substantial number of elements utilized in the FIG. 2 circuit, and for convenience in identification such elements are denoted with the same numerals but with the suffix "a" appended thereto. Thus, the circuit has a switch 33a that connects the power source to the charging capacitor 38a through a resistance 34a which has been substituted for the relay 34 of the prior embodiment. A counter switch 23a is included which functions in the manner heretofore described, and connects the source voltage to the bottom side of the capacitor 38a which is grounded through the resistance 39a. Newly added to the circuit are a capacitor 46, and resistance 47 that connects one side of the capacitor to the source voltage through a rectifier 36a. The opposite side of the capacitor 46 is grounded. Line 37a has the rectifier 44a therein, and connects the upper side of the capacitor 38a to the point of common connection between the resistance 47 and rectifier 36a, and also to the output line 48 which may be divided so as to define two points of connection $I_1$ and $I_2$.

The capacitors 38a and 46 are preferably of substantially the same value and may be, for example, about .1 mf. The resistance 47 is relatively small and may have a value of about 100 ohms. The value of the resistance 34a is selected so as to have a value that is less than the load resistance coupled to the output line 48. For example, the resistance 34a may have a value of about 5K when the load resistance is about .5 megohms. It should be understood, however, that the load resistance may be selected and varied so as to define whatever discharge time is most appropriate for the capacitance 46, and to thereby determine the length of the pulse appearing on the line 48 and which will be utilized to trigger or actuate the subsequent circuits.

When the switch 33a is closed and switch 23a is open, the capacitance 38a will charge to a value of 28 volts assuming that that is the value of the source voltage; and similarly, the capacitance 46 will charge to the same value through the rectifier 36a and resistance 47. When a package leaves the switch 23a so as to close it, the bottom side of the capacitor 38a is immediately brought to the source potential and the value of the voltage appearing at the line 37a is 56 volts, as heretofore described in connection with the embodiment shown in FIG. 2. Almost instantaneously, because of the polarization of the rectifier 44a and small value of the resistance 47, the charge differential appearing on the upper sides of the capacitors 38a and 46 tends to equalize, whereupon the 56 volts appearing on the upper side of the capacitor 38a is reduced to a value of 42 volts, and that appearing at the upper side of the capacitance 46 increases to 42 volts. It will be apparent that the respective decrease and increase of the voltages is in the value of 14 volts which is one-half the 28-volt increase which appeared on the upper plate of the capacitance 38a when the switch 23a was closed. The capacitance 38a has now served its function—namely, that of charging the capacitor 46; and when the switch 23a is again opened, the capacitance will charge through the resistance 34a to its original value of 28 volts.

The rate of discharge of the capacitor 46 will be dependent upon the value of the resistance load through which it must discharge, and thus is substantially independent of the remaining circuit elements for its path of discharge can only be through the line 48 since the rectifiers 36a and 44a block the flow of current in any other direction. Consequently, by varying the value of the resistance load, the duration of the 14-volt pulse present on the output line 48 can be made as long or as short as desired. It is apparent then that the circuit of FIG. 3 provides voltage pulses at the output 48 which may be utilized by subsequent circuitry independently of the discharge current from the capacitance 38a, and is thus distinguished from the circuit of FIG. 2 which depended for its functioning upon the discharge current from the capacitor 38.

Figure 4:
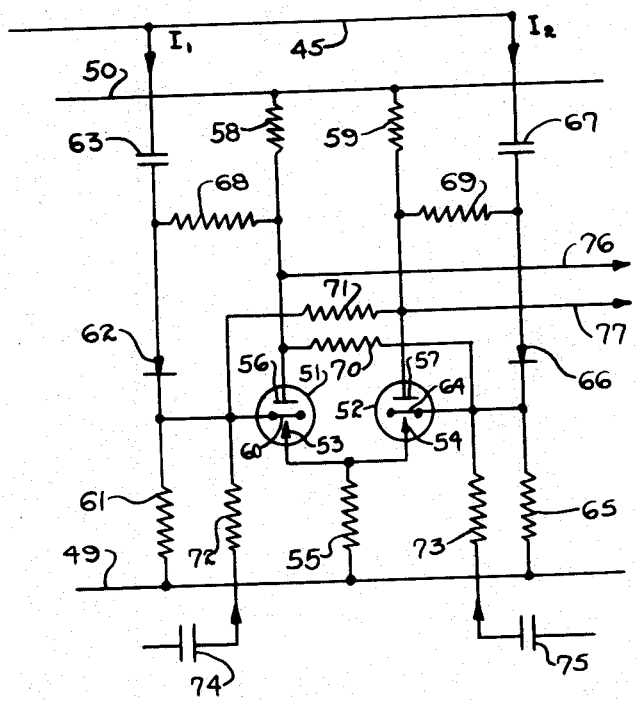
FIG. 4 is a schematic diagram of a count divider circuit triggered by pulses generated in either of the circuits shown in FIGS. 2 and 3.

The output pulses from either the circuit of FIG. 2 or that of FIG. 3 may be used to trigger or actuate subsequent circuits as, for example, the divider circuit shown in FIG. 4 which is essentially a flip-flop or gate circuit depending upon whether the inputs $I_1$ and $I_2$ are tied together. This circuit is used with a power source defined by lines 49 and 50; and since the voltage at the line 50 is of negative value, the positive side of such power source is grounded and comprises the line 49. The source voltage may have a value of about −20 volts.

The circuit comprises a pair of transistors 51 and 52 having the respective emitters 53 and 54 thereof tied together and connected to ground 49 through a resistance 55. The collectors 56 and 57 of the respective transistors are connected to B minus through load resistors 58 and 59. The base 60 of transistor 51 is grounded through resistance 61, and is also connected to input $I_1$ through rectifier 62 and capacitor 63. In a similar manner, the base 64 of transistor 52 is grounded through resistance 65, and is connected to input I₂ through rectifier 66 and capacitance 67. B minus voltage is applied to each of the respective bases 60 and 64 through the dropping resistors 68 and 69 which may be connected thereto through the rectifiers and, if desired, through the load resistors 58 and 59.

The collector 56 is tied to base 64 of the transistor 52 through resistor 70, and in a corresponding manner, the collector 57 is tied to the base 60 of transistor 51 through resistor 71. Also, the respective bases 60 and 64 may be additionally connected to B minus through resistors 72 and 73 and capacitors 74 and 75, respectively connected in series with such resistors. The output of the divider circuit appears on the lines 76 and 77, respectively connected to the collector 56 and transistor 51 and collector 57 and transistor 52. The circuit has two stable states, in one of which the transistor 51 conducts and the transistor 52 is cut off, and vice versa. The state of the circuit can be shifted from one to the other of these conditions by the application of appropriate input pulses thereto.

In describing the operation of the circuit, assume first that the transistor 51 is conducting and the transistor 52 consequently is cut off. In this condition, the voltage appearing at the output 76 will be about −5 volts, while that appearing at the output 77 will approximate the B minus voltage and will be, for example, between about −15 to −20 volts. Also then, the voltage appearing between the capacitor 63 and rectifier 62 will be about −5 volts, and this condition of the circuit will continue until appropriate input pulses are applied at I₁.

An input pulse or signal applied at I₁ in order to change the state of the circuit, must be of greater magnitude than the voltage (−5 volts) present at the point of connection between the capacitance 63 and rectifier 62. A change in voltage in the negative direction will not alter the conducting state of the circuit, and neither will a change in voltage that is not greater than the potential on the base of transistor 51. We know from the prior description that the value of the output pulse at the output line 45 of the circuit of FIG. 2 comprises a change in the positive direction of approximately 28 volts; and with the circuit of FIG. 3, the change in voltage appearing at the output line 48 is in the positive direction and has a value of approximately 14 volts. Since both of these voltage values are in the proper direction, and in magnitude exceed the value of the voltage appearing at the cathode of the rectifier 62, each will be effective to drive the base 60 of the transistor 51 positive whereupon it will be cut off. The voltage on the collector of this transistor will immediately rise toward the B minus value, and the voltage then caused to appear on the output line 76 will change from −5 volts to about −15 to −20 volts.

The base 64 of the transistor 52 will now be biased more negatively because of the application of the increased negative voltage applied thereto through the resistance 70 from the collector 56 of transistor 51, and transistor 52 will begin to conduct. The voltage appearing at the collector thereof will drop to some value much lower than the B minus voltage, and then the output line 77 will have a voltage of about −5 volts appearing thereon. This condition of the circuit will now be maintained until another pulse is received from the circuits of FIGS. 2 or 3 which, if coupled to I₂, will cause the transistor 52 to be cut off in the same manner as heretofore described in connection with the transistor 51, and the transistor 51 will again begin to conduct.

It is contemplated that a number of circuits of the type shown in FIG. 4 will be connected in a sequential network, and will serve to divide the sum of the pulses generated by the circuits of FIGS. 2 and 3. Each divider circuit of the type shown in FIG. 4 will divide by two so that if two such circuits are connected in a network, the output of the last will be one-fourth the number of pulses generated by the circuits of FIGS. 2 and 3. The reason for this is evident in that to trigger the circuit, it is necessary to have a pulse that exceeds in magnitude in a positive direction the voltage value on the base of the transistor which is most positively biased at any time. As a result, a change in voltage on the line 76 from −5 to −15 volts will not trigger a subsequent circuit for it is a change in the negative direction. However, the change in value from −15 to −5 volts appearing on the line 77 would be a change in the proper direction and of sufficient magnitude to trigger a subsequent dividing circuit. Therefore, if either of the outputs 76 or 77 is considered, it is necessary for two pulses to be received by the circuit of FIG. 4 in order to obtain a change on either of these output lines of proper character to trigger another circuit connected thereto.

One of the important advantages of the circuit of FIG. 4 is that it is not necessary to have a positive voltage to trigger it—that is, to cause it to flip from one stable position to another. As a result, it is possible to make positive voltages where no positive voltages exist anywhere in the circuit, and this is accomplished right within the circuit itself. Another advantage is that the circuit functions with very small capacitors, which results in a tremendous space saving.

While in the foregoing specification embodiments of the invention have been set forth in considerable detail for purposes of providing an adequate disclosure thereof, it will be apparent that those skilled in the art may make numerous changes therein without departing from the spirit and principles of the invention.

I claim:

In a circuit for detecting a change of predetermined character in a situation external thereof including a normally closed switch sensitive to such changes and being operative to open when a change is sensed thereby, said circuit having a serially connected relay coil and capacitor in parallel with said switch, a rectifier connected in parallel with said coil and with the input side thereof connected commonly with the switch and coil, a charging resistor for said capacitor and connected thereto, the point of connection between said switch, coil and rectifier being adapted to be connected to the positive side of a direct current power supply which has the negative side thereof grounded, and circuit ouput means connected to the point of serial connection of said relay coil and capacitor, a pulse-forming network arranged within said circuit output means comprising a rectifier having the input thereof connected to the output means of said circuit, serially connected resistance and capacitance elements having the free end of the resistance element connected to the output side of said second mentioned rectifier, said free end being further coupled to the one side of the direct current power source, and having the free end of said capacitance element grounded.

References Cited in the file of this patent
UNITED STATES PATENTS

| 2,635,197 | Routledge | Apr. 14, 1953 |
|---|---|---|
| 2,726,379 | Behn | Dec. 6, 1955 |
| 2,837,700 | Brown | June 3, 1958 |
| 2,876,396 | Rush | Mar. 3, 1959 |

FOREIGN PATENTS

| 481,054 | Great Britain | Mar. 4, 1938 |
|---|---|---|
| 252,012 | Switzerland | Sept. 16, 1948 |